US010960476B2

United States Patent
Nakano et al.

(10) Patent No.: US 10,960,476 B2
(45) Date of Patent: Mar. 30, 2021

(54) TIPPED CIRCULAR SAW BLADE

(71) Applicant: KANEFUSA KABUSHIKI KAISHA, Aichi (JP)

(72) Inventors: Takao Nakano, Aichi (JP); Kazuki Oyabu, Aichi (JP)

(73) Assignee: KANEFUSA KABUSHIKI KAISHA, Aichi (JP)

(*) Notice: Subject to any disclaimer, the term of this patent is extended or adjusted under 35 U.S.C. 154(b) by 11 days.

(21) Appl. No.: 16/343,021

(22) PCT Filed: Aug. 7, 2017

(86) PCT No.: PCT/JP2017/028542
§ 371 (c)(1),
(2) Date: Apr. 18, 2019

(87) PCT Pub. No.: WO2018/074038
PCT Pub. Date: Apr. 26, 2018

(65) Prior Publication Data
US 2020/0047267 A1 Feb. 13, 2020

(30) Foreign Application Priority Data
Oct. 18, 2016 (JP) .............................. JP2016-204381

(51) Int. Cl.
*B23D 61/04* (2006.01)
*B23D 61/02* (2006.01)

(52) U.S. Cl.
CPC ........... *B23D 61/04* (2013.01); *B23D 61/025* (2013.01)

(58) Field of Classification Search
CPC .................. B23D 61/04; B23D 61/025
See application file for complete search history.

(56) References Cited

U.S. PATENT DOCUMENTS 4,867,026 A * 9/1989 Henning .............. B23D 61/021
83/835
9,623,500 B2 * 4/2017 Friedrichs .............. B23D 59/02
(Continued)

FOREIGN PATENT DOCUMENTS

JP      H08187702 A      7/1996
JP      2001347421 A    12/2001
(Continued)

OTHER PUBLICATIONS

PCT/JP2017/028542 International Search Report and Written Opinion dated Oct. 3, 2017 (9 p.).
(Continued)

*Primary Examiner* — Omar Flores Sanchez
(74) *Attorney, Agent, or Firm* — Conley Rose, P.C.

(57) ABSTRACT

A tipped circular saw blade includes a disk-shaped metal base having a central axis of rotation, and a plurality of circumferentially-spaced tips extending radially outward from an outer periphery of the metal base. Each tip includes a flank along the radially outer portion thereof, a side face located along a side of the flank, and a chamfer extending between the flank and the side face. The chamfer is oriented at a chamfered angle with respect of the flank. Further, each tip includes a cutting edge located on an end of the flank in the circumferential direction. The cutting edge is configured to cut the workpiece. In addition, each tip includes a groove formed on the flank and extending circumferentially from the cutting edge. The width of the groove may be 0.20 mm to 0.30 mm.

20 Claims, 6 Drawing Sheets

(56) References Cited

U.S. PATENT DOCUMENTS

| | | | | |
|---|---|---|---|---|
| 9,789,552 B2 * | 10/2017 | Engvall | .................. | B23D 65/00 |
| 9,981,329 B2 * | 5/2018 | Tani | .................... | B23D 61/021 |
| 10,046,437 B2 * | 8/2018 | Hoang | .................... | B24D 5/06 |
| 10,105,773 B1 * | 10/2018 | Brewer | ................ | B27G 13/005 |
| 10,201,856 B2 * | 2/2019 | Harif | .................... | B23B 27/005 |
| 10,279,407 B2 * | 5/2019 | Brutscher | ............ | B23D 61/021 |
| 10,583,505 B2 * | 3/2020 | Nakajima | ............ | B23D 61/028 |
| 2001/0028831 A1 | 10/2001 | Iizuka et al. | | |
| 2007/0163416 A1 | 7/2007 | Burgess | | |
| 2016/0001383 A1 | 1/2016 | Nakajima et al. | | |

FOREIGN PATENT DOCUMENTS

| | | |
|---|---|---|
| JP | 2007196341 A | 8/2007 |
| JP | 2013154415 A | 8/2013 |
| JP | 2014161942 A | 9/2014 |
| JP | 2017001099 A | 1/2017 |

OTHER PUBLICATIONS

Chinese Office Action, for Chinese Application No. 201780064707.0 (3 p.).
English Translation of Chinese Office Action, for Chinese Application No. 201780064707.0 (5 p.).
European Search Report dated Jun. 18, 2020, for European Application No. 17862334.4 (9 p.).

* cited by examiner

COMPARING CUTTING CHIPS AND CUT SURFACES

| GROOVE TYPE | GROOVE WIDTH | GROOVE DEPTH | FEED AMOUNT: Sz 0.05mm | 0.07mm | 0.08mm |
|---|---|---|---|---|---|
| U-GROOVE | 0.23mm | 0.16mm | ○20%, △80% GOOD | △100% GOOD | △100% GOOD |
| V-GROOVE | 0.22mm | 0.08mm | △100% GOOD | ×100% SCRATCHES | |
| V-GROOVE | 0.24mm | 0.10mm | ○50%, △50% GOOD | ○10%, △90% GOOD | ×100% SCRATCHES |
| V-GROOVE | 0.26mm | 0.12mm | ○90%, △10% GOOD | ○50%, △50% GOOD | ○30%, △70% GOOD |

CUTTING CHIPS  ○: CUTTING CHIPS COMPLETELY SPLIT
△: CUTTING CHIPS PARTIALLY INTEGRATED (SEPARATION STREAK PARTS)
×: CUTTING CHIPS FULLY INTEGRATED (NO SEPARATION STREAK PARTS)

CUT SURFACES  GOOD: CUT SURFACES WITHOUT SCRATCHES
SCRATCHES: CUT SURFACES WITH SCRATCHES FORMED BY THE CUTTING CHIPS

FIG. 9

TIPPED CIRCULAR SAW BLADE

CROSS-REFERENCE TO RELATED APPLICATIONS

This application is a 35 U.S.C. § 371 national stage application of, and claims priority to, PCT Application No. PCT/JP2017/028542, filed Aug. 7, 2017, which claims priority to Japanese Patent Application No. 2016-204381, filed Oct. 18, 2016, both of which are incorporated herein by reference in their entireties for all purposes.

STATEMENT REGARDING FEDERALLY SPONSORED RESEARCH OR DEVELOPMENT

Not applicable.

BACKGROUND

The present disclosure generally relates to a disk-shaped circular saw blade including a plurality of tips arranged around an outer periphery thereof.

A conventional band saw cutting machine typically utilizes a band saw blade having a cutting width (blade thickness) of 1 mm as a cutting device to cut various metal workpieces at high speed. Japanese Laid-Open Patent Publication No. 2014-161942 discloses a circular saw cutting machine that utilizes a circular saw blade having a blade thickness of 2 mm to achieve cutting at higher speeds than a conventional band saw. The circular saw blade includes a circular metal base, tooth gullets formed at predetermined circumferential intervals around an outer periphery of the metal base, and hard tips fixed to each of the tooth gullets. The hard tips have a flank and a groove formed on the flank for splitting cutting chips.

BRIEF SUMMARY

According to one aspect of the present disclosure, a tipped circular saw blade may include a disc-shaped metal base, and tips joined to the metal base so as to protrude from an outer periphery of the metal base in a radial direction. An outer diameter of the circular saw blade may be 280 mm to 500 mm and a blade thickness of the tip may be 0.8 mm to 1.1 mm. Each of the tips includes a flank facing outward in the radial direction, a side face positioned at one of both ends of the flank in a thickness direction, and a chamfer formed between the flank and the side face. The chamfer has a chamfered angle with respect to the flank. Further, each of the tips may include a cutting edge positioned at one end of the flank in a circumferential direction to cut a workpiece, and a groove formed on the flank to extend from the cutting edge in the circumferential direction. A width of the groove may be 0.20 mm to 0.30 mm.

Accordingly, since the width of the groove is 0.20 mm to 0.30 mm, it has sufficient length to split cutting chips. This offers the potential to desirably prevent cut surfaces of the workpiece from becoming scratched by the cutting chips. On the other hand, the width of the groove is 0.20 mm to 0.30 mm while the blade thickness is 0.8 mm to 1.1 mm. Therefore, a sufficient effective length for the cutting edge is also ensured. As a result, a relatively high chipping resistance for the tips can be achieved.

According to another aspect, the groove includes a pair of groove ends at the cutting edge, a pair of straight beveled surfaces extending from each of the groove ends, and a curved groove bottom configured to connect the pair of beveled surfaces. Groove end angles formed between the beveled surfaces and the flank are preferably acute angles. In this configuration, rigidity at corners between the cutting edge and the beveled surfaces of the groove are increased so that chipping of the tips may be reduced.

BRIEF DESCRIPTION OF THE DRAWINGS

FIG. 9 is a table showing results of experiments of the cutting chips of the workpiece and the cut surface of the workpiece cut with various embodiments of circular saw blades in accordance with principles described herein.

DETAILED DESCRIPTION

As previously described, a conventional circular saw blade for a circular saw cutting machine typically has a blade thickness of 2 mm to achieve cutting at higher speeds than a conventional band saw. A thinner circular saw blade offers the potential to reduce the amount of cutting chips produced during cutting and to use a workpiece more effectively. However, it has conventionally been believed that the minimum blade thickness of such a circular saw blade is 2.0 mm because a circular saw blade having a thickness less than 2.0 mm was believed to exhibit poor durability of the circular saw blade and be prone to break at the groove used to split cutting chips. Accordingly, embodiments described herein are directed to tipped circular saw blades with a reduced thickness and improved breaking resistance (e.g., durability).

Figure 1:
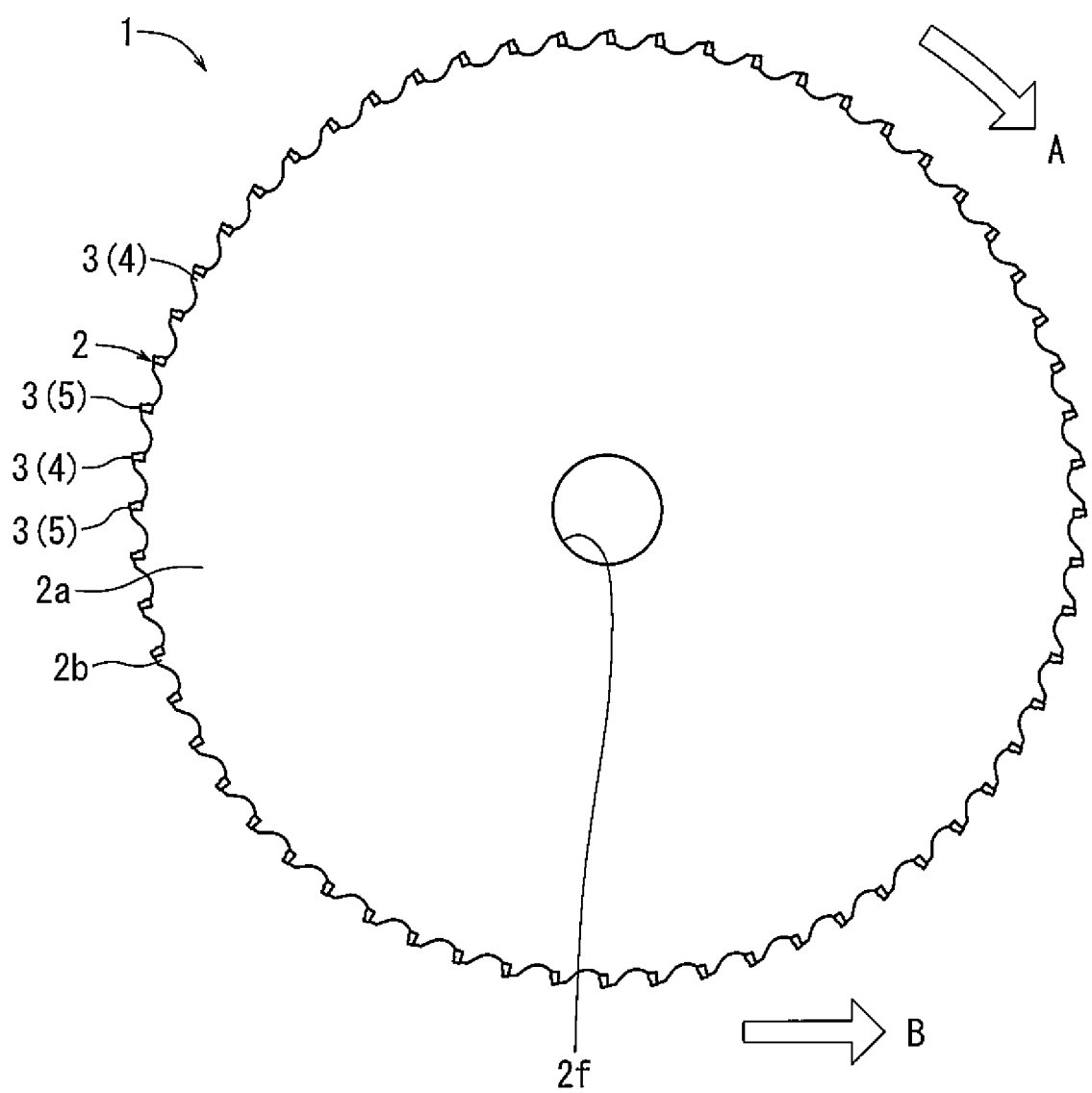
FIG. 1 is a side view of an embodiment of a circular saw blade in accordance with principles described herein.

One exemplary embodiment according to the present disclosure will be described with reference to FIGS. 1 to 7. As illustrated in FIG. 1, a circular saw blade 1 includes a circular or disc-shaped metal base 2 and a plurality of uniformly circumferentially-spaced tips 3 arranged around an outer periphery of the metal base 2. The outer diameter of the circular saw blade 1 is, for example, 280 mm to 500 mm; preferably, 280 mm to 460 mm; more preferably, 280 mm to 360 mm. The metal base 2 is made of, for example, steel and has a thickness of, for example, 0.6 mm to 1.0 mm. The metal base 2 includes a disc-shaped main body 2a and teeth 2b protruding radially outward from an outer periphery of the main body 2a.

Figure 2:
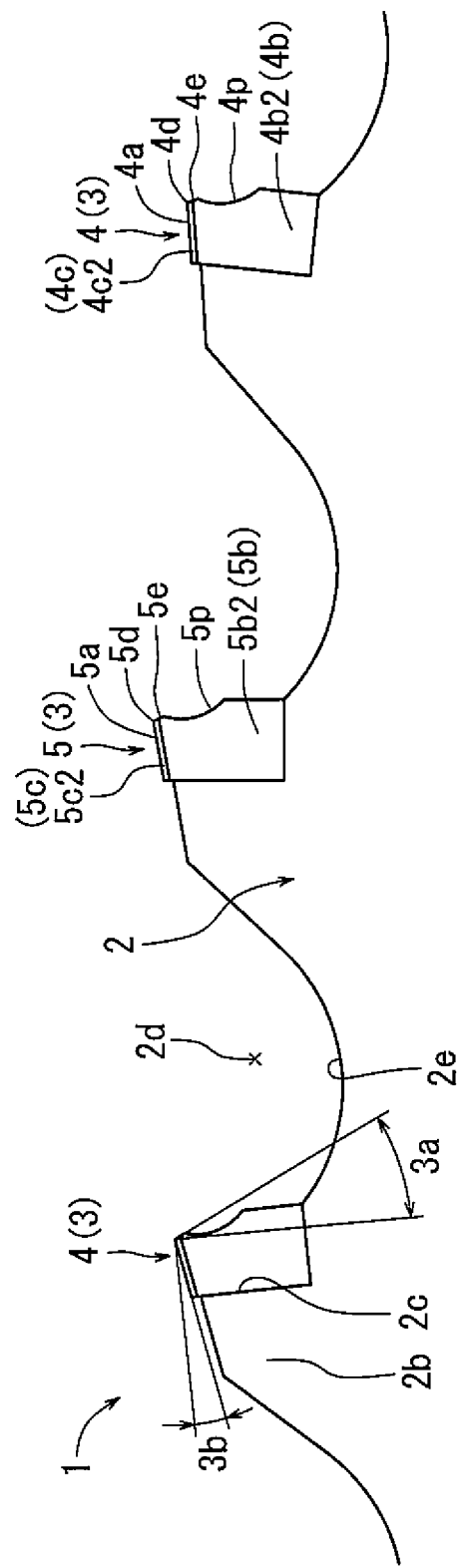
FIG. 2 is an enlarged, partial side view of the circular saw blade of FIG. 1.

As illustrated in FIGS. 1 and 2, the teeth 2b are formed around the outer periphery of the main body 2a at predetermined circumferential intervals. Tooth gullets 2d are formed between the teeth 2b. Each of the tooth gullets 2d has a circumferential width that decreases moving radially inward from a radially outer side toward a gullet bottom 2e. One side of each tooth 2b is formed with a recess 2c that opens on one side in a circumferential direction and outward in a radial direction. Each tip 3 is seated in a corresponding recess 2c and attached to the corresponding tooth 2b within the corresponding recess 2c.

As illustrated in FIG. 1, for example, 40 to 100 tips 3 are attached to the metal base 2 by, for example, brazing. The tips 3 are provided on the metal base 2 at predetermined intervals and, for example, tips 4 and tips 5 having different configurations are alternately attached. The tips 3 are made of, for example, cemented carbide and obtained by, for example, mixing and sintering, for example, tungsten carbide and cobalt as a binding agent. The tips 3 may be a cermet such as TiN, TiC, TiCN. The surface of the tips 3 may be coated to improve wear resistance.

As illustrated in FIGS. 2 to 5, each of the tips 3 (4 and 5) has a substantially rectangular parallelepiped shape and includes a flank 4a or 5a disposed along the radially outer portion thereof. Each of the flanks 4a and 5a has a rectangular shape and includes longer sides having lengths that are greater than the thickness of the metal base 2. One of the longer sides forms a cutting edge 4d or 5d of the corresponding tip 3 (4 and 5). The length of the cutting edges 4d and 5d (measured in the direction of the blade thickness) is, for example, 0.8 mm to 1.1 mm. The clearance angle 3b measured between a circumferential tangent line of the metal base 2 at the cutting edges 4d and 5d and the flanks 4a and 5a is, for example, 5 to 15 degrees. The flanks 4a and 5a extend radially outward from the peak of the teeth 2b and protrude beyond the teeth 2b in the radial direction. The cutting edges 4d or 5d are positioned at the leading end of the flanks 4a and 5a relative to the direction of rotation of the circular saw blade 1.

As illustrated in FIG. 2, each of the tips 3 has a rake face 4e or 5e extending from the cutting edges 4d or 5d toward the center of the metal base 2. Each of the rake angles 3a of each of the rake faces 4e and 5e with respect to a diametrical line of the metal base 2 is 0 to −30 degree(s). Concave recesses 4p and 5p are positioned along predetermined regions radially inward and adjacent each of the rake faces 4e and 5e. The recesses 4p and 5p are recessed toward the center of the tips 4 and 5 from the rake faces 4e and 5e, as seen from the side view.

Figure 3:
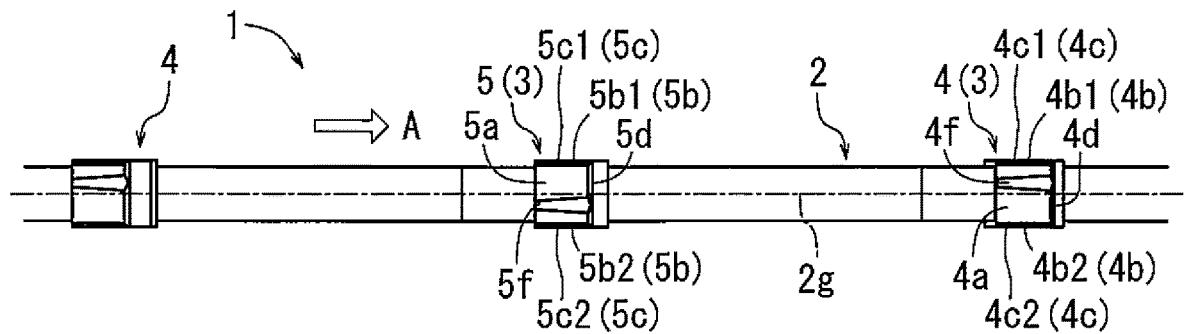
FIG. 3 is an enlarged, partial top view of the circular saw blade of FIG. 1.
Figure 5:
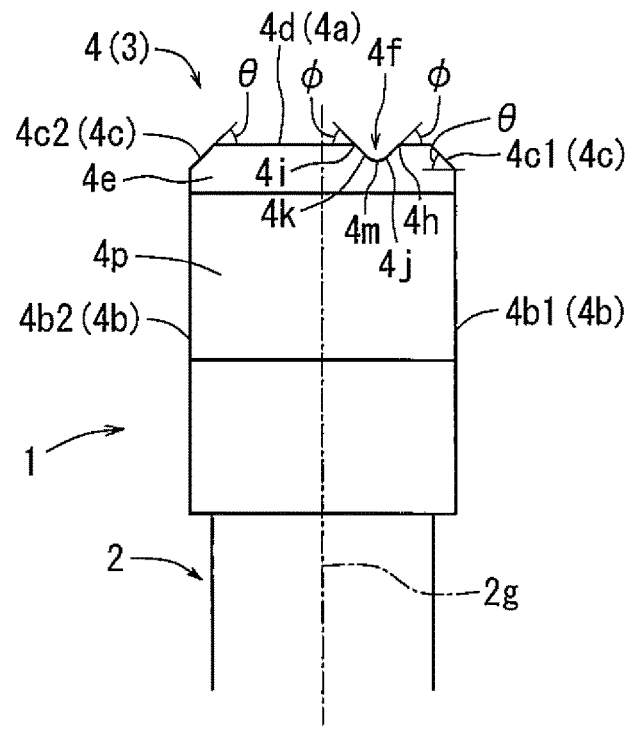
FIG. 5 is an enlarged front view of an upper portion of the circular saw blade of FIG. 1.

As illustrated in FIGS. 3 and 5, each of the tips 3 has side faces 4b and 5b extending radially from the sides of the flanks 4a and 5a. The side faces 4b and 5b are substantially orthogonal to the flanks 4a or 5a and substantially parallel to the planar surfaces of the metal base 2. More specifically, the side faces 4b and 5b form a side angle of about 1 degree oriented toward the thickness center direction of the metal base 2 with respect to the surface of the metal base 2. Chamfers 4c and 5c are provided at the intersection of the flanks 4a and 5a and the side faces 4b and 5b. The chamfers 4c and 5c have a chamfered angle θ with respect to the flanks 4a and 5a. Each of the tips 4 and 5 has a pair of the chamfers 4c and 5c. The pair of the chamfers 4c and 5c have the chamfered angle θ of substantially same degree with respect to the flanks 4a and 5a.

More specifically, as illustrated in FIGS. 2 to 5, each of the tips 4 and 5 has the flank 4a or 5a, the first side face 4b1 or 5b1, as well as the second side face 4b2 or 5b2. The first chamfer 4c1 or 5c1, having the chamfered angle θ with respect to the flank 4a or 5a, is formed between the flank 4a or 5a and the first side face 4b1 or 5b1. The second chamfer 4c2 or 5c2, having the chamfered angle θ with respect to the flank 4a or 5a, is formed between the flank 4a or 5a and the second side face 4b2 or 5b2.

Heat is repeatedly applied to the tips 3 during cutting since the circular saw blade 1 generates frictional heat while cutting a workpiece. Therefore, corners where the angles are small may be chipped due to heat (e.g., a thermal crack). On the other hand, the chamfers 4c and 5c are formed at edges of the flanks 4a and 5a. Therefore, the angle at the corners formed between the flanks 4a and 5a and the side faces 4b and 5b is increased due to the chamfers 4c and 5c. As a result, the potential for thermal cracks is reduced between the flanks 4a and 5a and the side faces 4b and 5b.

As illustrated in FIG. 3, the chamfers 4c and 5c are planar and are formed over the entire length at the edges of the flanks 4a and 5a. The width of the chamfers 4c and 5c in the thickness direction is, for example, 0.05 mm to 0.1 mm. The chamfers 4c and 5c have substantially the same width along the entire length of the flanks 4a and 5a.

As illustrated in FIGS. 3 to 6, each of the grooves 4f and 5f is formed on the flank 4a or 5a of the tip 4 or 5 to promote splitting of the cutting chips. The grooves 4f and 5f extend generally circumferentially from the cutting edges 4d and 5d defining one end of the flanks 4a and 5a to the other end of the flanks 4a and 5a. In this embodiment, each of the grooves 4f and 5f has a V-shaped configuration as seen from a front view and includes a pair of beveled surfaces 4j and 4k, which are inclined with respect to the flanks 4a and 5a. Each of the grooves 4f and 5f includes a groove bottom 4m and 5m extending between the beveled surfaces 4j and 4k. The groove bottoms 4m and 5m have are concave in front view. As best shown in the front view of FIG. 6, the width X of the grooves 4f and 5f at the cutting edges 4d and 5d is, for example, 0.20 mm to 0.30 mm, while the depth Z of the grooves 4f and 5f is 0.10 mm to 0.15 mm.

Figure 6:
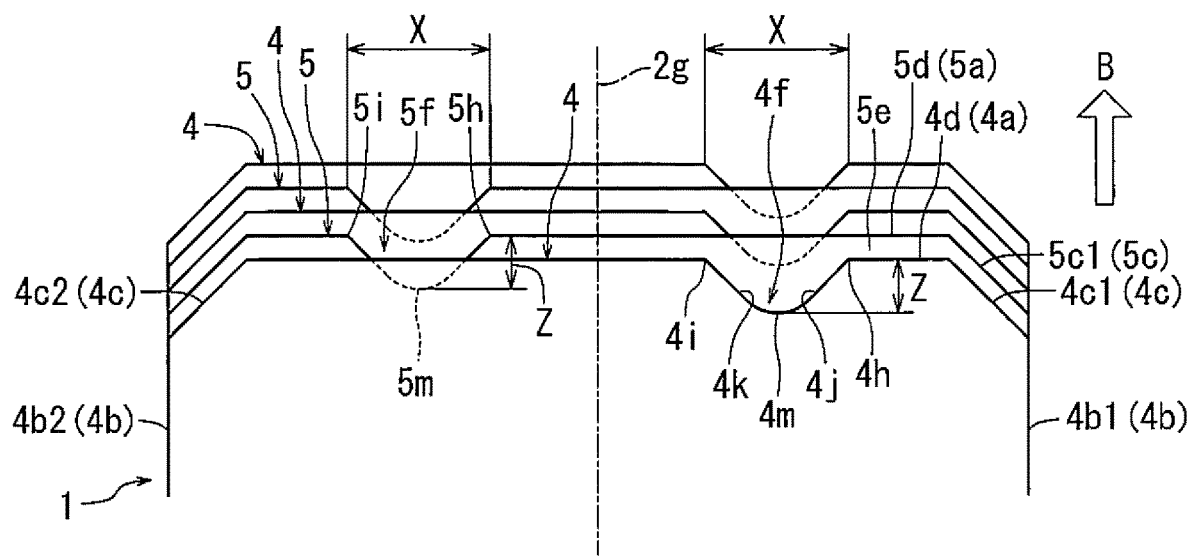
FIG. 6 is a schematic view showing the relationship between tips and feeding when cutting a workpiece with the circular saw blade of FIG. 1.

As shown in FIGS. 5 and 6, the groove 4f has a first groove end 4h located at the cutting edge 4d and a second groove end 4i located at the cutting edge 4d but further away from the first chamfer 4c1 than the first groove end 4h. Each of the beveled surfaces 4j and 4k is planar and has a groove end angle φ with respect to the flank 4a. The groove end angles φ of the first groove end 4h and the second groove end 4i are substantially the same angle. The angles of the beveled surfaces 4j and 4k with respect to the flank 4a are substantially the same as well. The groove 4f extends from the cutting edge 4d in a circumferentially tangential direction (left direction in FIG. 3) and the depth of the groove is reduced as it goes further away from the cutting edge 4d.

The groove end angle φ is preferably greater than or equal to 40 degrees and less than or equal to 60 degrees. When the groove end angle φ exceeds 60 degrees, the angle at the corner defined between the groove 4f and the flank 4a will be relatively small. As a result, when the groove end angle φ exceeds 60 degrees, it may be more prone to chipping due to thermal cracking or the like. For this reason, the groove end angle φ is preferably less than or equal to 60 degrees to enhance durability. When the groove end angle φ is less than 40 degrees, the groove 4f will be shallow, assuming that the depth of the groove 4f measured radially from flank 4a is constant. As a result, the groove bottom 4m of the groove 4f may come into contact with and cut the workpiece. Consequently, the cutting chips may be less frequently split by the grooves 4f For example, in contrast with the cutting chips 6 and 7 illustrated in FIG. 7, the cutting chips 6 and 7 may not be split apart but remained connected. In view of facilitating the splitting of the cutting chips, the groove end angle φ should preferably be greater than or equal to 40 degrees.

As illustrated in FIG. 3, each of the tips 4 and 5 includes a groove 4f or 5f. Groove 4f is offset from the center line 2g in the thickness direction of the tip 4, and is positioned closer to the first lateral side of the tip 4 than the center line 2g in the thickness direction (axial directed relative to the central axis of rotation of saw blade 1). The groove 5f at the tip 5 is also offset from the center line 2g in the thickness direction of the tip 5, however, the groove 5f is closer to the second lateral side of the tip 5 than the center line 2g in the thickness direction. The tips 4 and 5 are alternately arranged around the outer peripheral edge of the metal base 2.

As illustrated in FIG. 1, the metal base 2 has an attachment hole 2f in the center thereof. A rotary shaft of the circular saw machine is inserted into the attachment hole 2f. The circular saw machine may be used, for example, for cutting various sorts of metals and used, for example, when cutting a workpiece at room temperature. The circular saw machine advances the circular saw blade 1 in a B direction while rotating the circular saw blade 1 about its central axis in an A direction when cutting the workpiece. For example, the circular saw machine includes a motor to rotate the rotary shaft, and a motor which moves the rotary shaft or a table on which the workpiece is placed in the horizontal direction. As illustrated in FIG. 6, the circular saw blade 1 is rotated in the A direction (see FIG. 3) while the circular saw blade 1 is moved in the B direction (upward) with respect to the workpiece. In this way, the tips 4 and 5 alternately come in contact with the workpiece.

Figure 4:
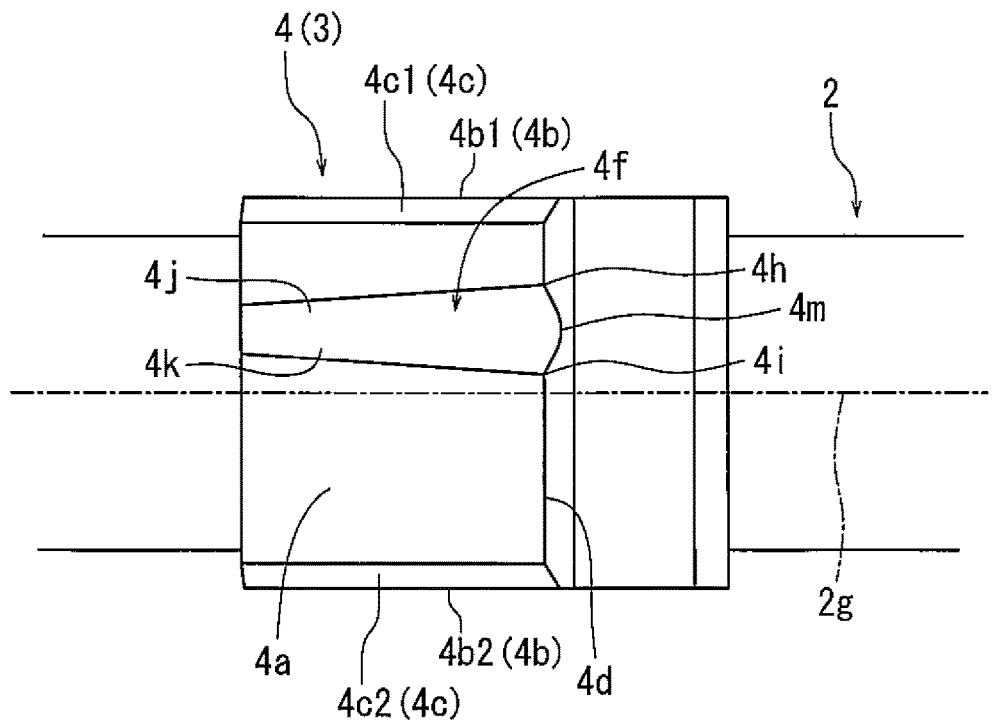
FIG. 4 is an enlarged, partial top view of the circular saw blade of FIG. 1.

As illustrated in FIGS. 4 and 5, the tip 4 has a first chamfer 4c1 on one lateral side of the flank 4a in the thickness direction and a second chamber 4c2 on the opposite lateral side. The first chamfer 4c1 and the second chamfer 4c2 have symmetrical shapes with respect to the center line 2g in the thickness direction. The groove 4f is located in an area closer to the first chamfer 4c1 than the center line 2g in the thickness direction. The groove 4f has a symmetrical shape in the thickness direction about the groove bottom 4m.

Figure 7:
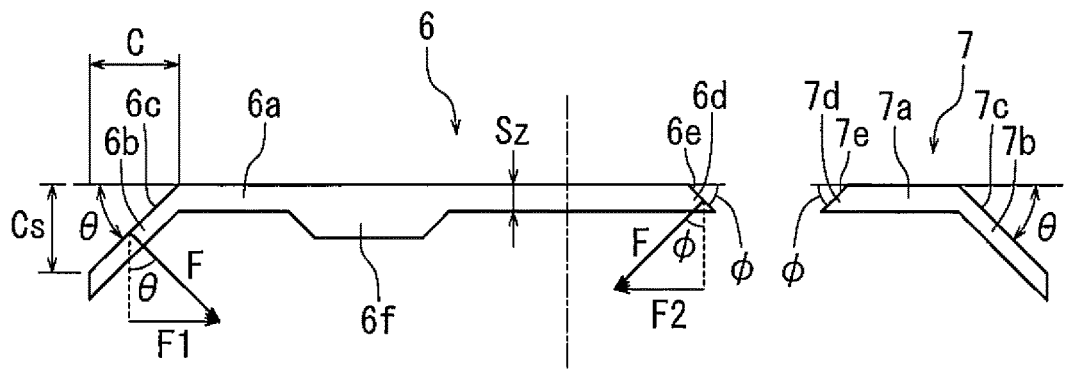
FIG. 7 is a cross-sectional view of cutting chips cut out from the workpiece with the circular saw blade of FIG. 1.

As illustrated in FIG. 7, cutting chips cut out of the workpiece by the tips 4 may be split into the cutting chips 6 and 7 due to the grooves 4f (see FIG. 6). The cutting chips 6 and 7 include cutting chip bodies 6a and 7a, chamfer corresponding parts 6b and 7b, and groove corresponding parts 6d and 7d. The cutting chip bodies 6a and 7a are rectangular in cross section and formed by the cutting edges 4d and 5d of the two tips 4 and 5. For example, the upper edges of the cutting chip bodies 6a and 7a are formed by the cutting edges 4d of the tips 4, while the lower edges are formed by the cutting edges 5d of the tips 5. A trapezoidal protrusion 6f is formed at the center of the lower edge of the cutting chip body 6a. Lateral surfaces of the protrusion 6f are formed by the groove 5f of the tip 5, which has cut the workpiece prior to the tip 4. The leading end of the protrusion 6f is formed by the cutting edges 4d of the tip 4, which has cut the workpiece prior to the tip 5.

As illustrated in FIG. 7, the chamfer corresponding parts 6b and 7b have a parallelogram shape and are formed by the chamfers 4c and 5c of the two tips 4 and 5. For example, the upper edges of the chamfer corresponding parts 6b and 7b are formed by the chamfers 4c of the tips 4, while the lower edges are formed by the chamfers 5c of the tips 5. The groove corresponding parts 6d and 7d may have a triangular shape and be formed by the groove 4f of the tip 4.

As illustrated in FIG. 1, the circular saw blade 1 is advanced in the B direction while being rotated in the A direction so as to cut the workpiece. The workpiece may be, for example, configured in a rod-like shape, and cut to a predetermined length. The cut workpiece is processed into a product, for example, through forging. For example, a gear or the like may be formed out of the cut workpiece by cold forging.

The circular saw blade 1 cuts the workpiece such that two facing cut surfaces are formed in the workpiece, and passes through between the two cut surfaces. The cut surfaces may be scratched by the circular saw blade 1 and the cutting chips 6 and 7 produced during cutting. The scratches on the cut surfaces may affect the surface roughness of a product which is processed by cold forging etc. For example, the teeth of the gear may have scratches corresponding to the scratches on the cut surfaces and the surface roughness of the teeth may be coarse because of these scratches. As a result, accuracy of meshing gears may be poor. Therefore, abnormal noise may be generated at the meshing parts of the gears. In the present embodiment, the scratches on the cut surface of a workpiece by the cutting chips 6 and 7 are reduced by controlling the discharge direction of the cutting chips 6 and 7.

Referring to FIGS. 6 and 7, the cutting chips 6 and 7 receive a force from the tips 4 and 5 when cut out from the workpiece. Consequently, the cutting chips 6 and 7 are discharged at the predetermined angle with respect to the thickness direction (right and left direction in the drawings). In theory, when the cutting chips 6 and 7 are discharged parallel to the cut surfaces i.e., without an angle with respect to the thickness direction, the cutting chips 6 and 7 would not scratch the cut surfaces. However, in reality, the cut surfaces are scratched as the cutting chips 6 and 7 are deflected in the thickness direction under various conditions.

In view of the problem described above, the embodiments described herein are designed and configured to discharge the cutting chips 6 and 7 substantially parallel to the cut surfaces and slightly inward (in the center direction). Further, embodiments described herein are designed and configured such that the cutting chips 6 and 7 do not reach the opposite side cut surface since the cutting chips 6 and 7 pass through between the two cut surfaces. More specifically, the cutting chips 6 and 7 do not reach the opposite side cut surface, so as not to form scratches on the opposite side cut surface. The discharge of the cutting chips 6 and 7 will be described in more detail below.

As illustrated in FIG. 7, the cutting chip 6 has a symmetrical cutting chip body 6a and a symmetrical protrusion 6f. Further, the cutting chip 6 has the chamfer corresponding part 6b at the outer side in the thickness direction and a groove corresponding part 6d at the center in the thickness direction. Accordingly, the chip 6 is discharged from the workpiece at the predetermined angle in the thickness direction, due to the difference between the force received on the chamfer corresponding part 6b from the tip 4 and the force received on the groove corresponding part 6d from the tip 4.

As illustrated in FIG. 7, the force F1 in the thickness direction received on the chamfer corresponding part 6b can be determined in accordance with the formula (1) as shown below. More specifically, F1 can be obtained by determining the area of the chamfer corresponding part 6b (by multiplying the thickness of the chamfer corresponding part 6b and the length thereof), and subsequently multiplying the directional component of the force. The Force F2 in the thickness direction received on the groove corresponding part 6d can be determined in accordance with the formula (2) as shown below. More specifically, the force F2 can be obtained by determining the area of the groove corresponding part 6d (by multiplying the thickness of the groove corresponding part 6d and the length thereof, and dividing by 2 since it is a triangle), and subsequently multiplying the directional component of the force.

$$F1 = Sz \times \cos\theta \times C/\cos\theta \times F \times \sin\theta = F \times C \times Sz \times \sin\theta; \quad \text{Formula 1}$$

$$F2 = Sz \times \cos\varphi \times Sz/\sin\varphi/2 \times F \times \sin\varphi = F \times Sz^2/2 \times \cos\varphi; \quad \text{Formula 2}$$

wherein:

Sz is a feed amount of the circular saw blade 1. More specifically, a feed amount per tip.

θ is a chamfered angle of the chamfer 4c with respect to the flank 4a.

φ is a groove end angle of the groove end 4i with respect to the flank 4a.

F is the force received from the tips 4 per unit area.

A cutting chip distorting degree B is defined as a degree of the force received by the cutting chip 6 in the thickness direction.

Cutting chip distorting degree $B$=Force $F1$ on the chamfer in the thickness direction/Force $F2$ on the groove in the thickness direction  Formula 3

$$B = F1/F2 = 2Cs \times \cos\theta/Sz/\cos\varphi \approx 2\cos\theta/\cos\varphi (Cs \approx Sz)$$

The greater the cutting chip distorting degree B, the greater the angle of the cutting chip 6 being directing towards the center, with respect to the thickness direction. A cutting chip distorting degree B less than 1 means that the cutting chip 6 is directed outwards, with respect to the thickness direction. Formulas 1, 2, and 3 may also be applied to the cutting chip 7. In other words, the force in the thickness direction received on the chamfer corresponding part 7b of the cutting chip 7 may be determined in accordance with the formula (1). The force in the thickness direction received on the groove corresponding part 7d may be determined in accordance with the formula (2). Further, the above idea may be applied not only to the cutting chips 6 and 7 cut out from the workpiece with the tips 4 but also to the cutting chips cut out from the workpiece with the tips 5.

Furthermore, according to the above idea, the cutting chips 6 and 7 are theoretically split due to the grooves 4f of the tips 4. However, the cutting chips 6 and 7 may actually remain connected under various conditions. For example, a separation streak part, which is thinner than the thickness at the other parts, may be formed between the cutting chips 6 and 7. The cutting chips 6 and 7 may be connected with the separation streak part. The separation streak part may easily break because of its thinness. Therefore, when the separation streak part breaks, the cutting chips 6 and 7 head towards the center with respect to the thickness direction, with the separation streak part being a break point. Consequently, even when the cutting chips 6 and 7 are not completely separated, the cut surfaces are prevented from being scratched, as the cutting chips 6 and 7 move away from the cut surfaces of the workpiece.

Figure 8:
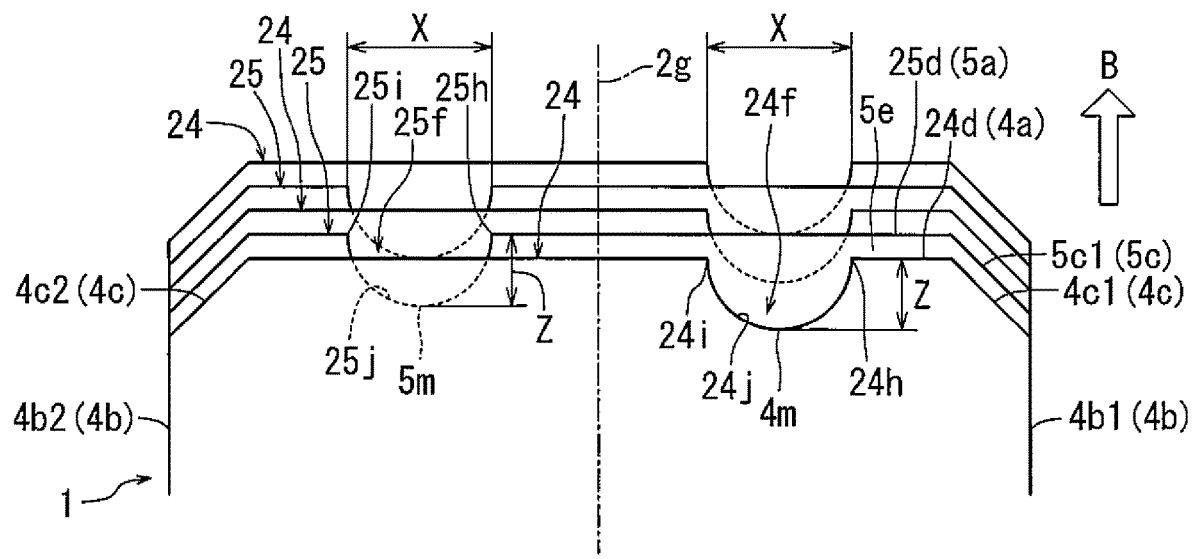
FIG. 8 is a schematic view showing the relationship between tips and feeding when cutting a workpiece with an embodiment of a tipped circular saw blade in accordance with principles described herein and having grooves according to another structure.

As described above, the circular saw blade 1 includes tips 4 and 5 each having a V-shaped groove 4f or 5f in a front view. In other embodiments, the circular saw blade 1 may include tips each having a groove in other shapes. For example, the circular saw blade 1 may have tips 24 and 25 each having a groove 24f or 25f as illustrated in FIG. 8. The grooves 24f and 25f are U-shaped in front view and connect first groove ends 24h and 25h and second groove ends 24i and 25i at the cutting edges 24d and 25d in a concave circular arc manner. The tips 24 and 25 have other parts similar to tips 4 and 5. These parts shall be denoted by the same reference numerals as those of the tips 4 and 5, and will not be described in detail.

Experimental results indicate that the embodiments described herein result in the cut surface scarcely getting scratched. One example of the results of the experiments will be described below. In the following description, grooves 4f and 5f formed in a V-shape when viewed from the front will be referred to as "V-grooves," while the grooves 24f and 25f formed in the U-shape when viewed from the front will be referred to as "U-grooves."

A circular saw blade 1 having various tips 4 and 5 was prepared for experiments. An outer diameter of the circular saw blade 1 was 285 mm, the thickness of the metal base 2 was 0.8 mm, the blade thickness of the tips 4 and 5 was 1.0 mm and the number of teeth was 60. A round rod made of S10C (Carbon steel for machine structure) having a diameter of 50 mm was prepared as a workpiece. Processing conditions were set for three types of feed speed: 0.05 mm/tooth, 0.07 mm/tooth, and 0.08 mm/tooth, while the rotational speed was set to 187 rpm. As illustrated in FIG. 9, four types of grooves at the tips 4 and 5 were prepared. The conditions of the cutting chips and the cut surfaces were compared.

The workpiece was cut using the circular saw blade 1 with the tips having a U-shaped groove type, the groove having a width of 0.23 mm and a depth of 0.16 mm. About 20% of the entire cutting chips were completely split into two cutting chips 6 and 7 at the feed speed of 0.05 mm/tooth, as illustrated in FIG. 9. About 80% of the entire cutting chips 6 and 7 were connected with a separation streak part. The cut surfaces were in satisfactory condition without surface scratches. At the feed speed of 0.07 mm/tooth, 100% of the entire cutting chips 6 and 7 were connected with a separation streak part. The cut surfaces were in satisfactory condition without surface scratches. At the feed speed of 0.08 mm/tooth, 100% of the entire cutting chips 6 and 7 were connected with a separation streak part. The cut surfaces were in satisfactory condition without surface scratches.

The workpiece was also cut using the circular saw blade 1 with the tips having a V-shaped groove type, the groove having a width of 0.22 mm and a groove depth of 0.08 mm. At the feed speed of 0.05 mm/tooth, 100% of the entire cutting chips 6 and 7 were connected with a separation streak part. The cut surfaces were in satisfactory condition without surface scratches. At the feed speed of 0.07 mm/tooth, 100% of the entire cutting chips 6 and 7 were connected without a separation streak part. However, surface scratches were formed on the cut surface, due to the cutting chips. Since surface scratches were developed at a feed speed of 0.07 mm/tooth, the experiment was not carried out at a feed speed of 0.08 mm/tooth.

The workpiece was also cut using the circular saw blade 1 with tips having a V-shaped groove type, the groove having a width of 0.24 mm and a depth of 0.10 mm. About 50% of the entire cutting chips were completely split into two cutting chips 6 and 7 at a feed speed of 0.05 mm/tooth. About 50% of the entire cutting chips 6 and 7 were connected with a separation streak part. The cut surfaces were in satisfactory condition without surface scratches. At a feed speed of 0.07 mm/tooth, about 10% of the entire cutting chips were completely split into two cutting chips 6 and 7. About 90% of the entire cutting chips 6 and 7 were connected with a separation streak part. The cut surfaces were in satisfactory condition without surface scratches. At a feed speed of 0.08 mm/tooth, 100% of the entire cutting chips 6 and 7 were connected without a separation streak part. Surface scratches developed on the cut surfaces due to the cutting chips.

The workpiece was also cut using the circular saw blade 1 with tips having a V-shaped groove type, the groove having a width of 0.26 mm and a depth of 0.12 mm. About 90% of the entire cutting chips were completely split into two cutting chips 6 and 7, at a feed speed of 0.05 mm/tooth. About 10% of the entire cutting chips 6 and 7 were connected with a separation streak part. The cut surfaces were in satisfactory condition without surface scratches. At a speed of 0.07 mm/tooth, about 50% of the entire cutting chips were completely split into two cutting chips 6 and 7. About 50% of the entire cutting chips 6 and 7 were connected with a separation streak part. The cut surfaces were in satisfactory condition without surface scratches. At a feed speed of 0.08 mm/tooth, about 30% of the entire cutting chips 6 and 7 were completely split into two cutting chips 6 and 7. For about 70% of the entire cutting chips, the cutting chips 6 and 7 were connected with a separation streak part. The cut surfaces were in satisfactory condition without surface scratches.

From the results of the above experiments, it was found that the cutting chips are discharged from the workpiece without affecting the cut surfaces, both in the case where the cutting chips are completely split into two cutting chips 6 and 7 and also when two cutting chips 6 and 7 are connected with a separation streak part. On the other hand, it was observed that the cut surfaces are scratched by the cutting chips when the two cutting chips 6 and 7 are connected without a separation streak part.

The wear conditions of the tips were evaluated after cutting the workpiece with circular saw blades 1 equipped with tips having either a U-groove or V-groove. For the experiments, circular saw blades 1 with various tips 4 and 5 were prepared. The outer diameter of each circular saw blade 1 was 285 mm, the thickness of the metal base 2 was 0.8 mm, and the blade thickness of the tips 4 and 5 was 1.0 mm. The tips having the U-groove and the V-groove were attached to two teeth out of 60 teeth, respectively. A round rod made of SUJ2 (High Carbon Steel) having a diameter of 30 mm was prepared as a workpiece. Cutting was carried out 100 times (corresponding to 3,000 cuts for each shape of the total of 60 teeth), setting the rotational speed to 105 rpm and the feed speed 0.05 mm/tooth as a processing speed.

There was no significant difference in the amount of wear on the flanks of the tips having either the U-groove or the V-groove. More specifically, regarding the tip having the U-groove, the wear width in the circumferential direction at the center of the cutting edge on the flank was 79 μm, while the wear width in the circumferential direction at the groove end of the flank was 140 μm. Regarding the V-groove, the wear width in the circumferential direction at the center of the cutting edge of the flank was 83 μm, while the wear width in the circumferential direction at the groove end of the flank was 134 μm. A retraction amount of the groove end of the U-groove in the thickness direction of the cutting edge was 33 μm. A retraction amount of the groove end of the V-groove in the thickness direction on the cutting edge was 16 μm. Therefore, it is evident that the groove end of the V-groove is barely worn, compared to the groove end of the U-groove. The groove width of the groove is widened due to wear at the end of the groove. Expansion of the groove width was equal on the right and left sides. The retraction amount of the groove end of the U-groove in the thickness direction of the cutting edge is about twice as large as the retraction amount of the groove end of the V-groove in the thickness direction of the cutting edge. Chamfer-like chippings (wear) were observed at the corners of the U-groove.

As described-above, there was a difference in the amount of wear between the U-groove and the V-groove. When the U-groove is used, the chamfers 4c and 5c apply a load on the cutting chips in the side face direction and the load is transmitted vertically on the side face of the U-groove. On the other hand, when the V-groove is used, the load applied by the chamfers 4c and 5c in the side face direction is dispersed in a radial direction by the beveled surfaces 4j and 4k, similar to the chamfers 4c and 5c. In view of the above, it is understood that the load applied to the beveled surfaces 4j and 4k may be reduced and the wear at the V-groove may be less than the wear at U-groove. Further, since the angle of the U-groove with respect to the cutting edge is greater than that of the V-groove, it is believed that corner chipping may more likely to occur with the U-groove. The expansion speed of the groove width due to the wear of the U-groove is faster than that of the V-groove. The cutting edge is divided into two regions by the groove, and both of the regions will become shorter because of the expansion of the groove width. It is believed that chipping is more likely to occur when the region is shorter, because its length cannot withstand the cutting impact.

As described-above, while the blade thickness of the tipped circular saw blade 1 according to the present embodiment is 0.8 mm to 1.1 mm, the groove width is structured to be 0.20 mm to 0.30 mm. Therefore, the groove width is relatively short as compared the blade thickness. Consequently, the effective length of the cutting edges 4d and 5d is long so that the chipping resistance of the tips will be relatively high. Further, with the configuration including grooves having the above described predetermined width, the cutting chips may be easily split. In this way, it is possible to prevent the cut surface of the workpiece from getting scratched by the cutting chips.

The grooves 4f, 5f on the cutting edges 4d, 5d include a pair of a first groove end 4h, 5h and a second groove end 4i, 5i, and a pair of linear beveled surfaces 4j, 5j and 4k, 5k extending from the first groove end 4h, 5h and the second groove end 4i, 5i, and curved groove bottoms 4m, 5m configured to connect the beveled surfaces 4j, 5j and 4k, 5k. The beveled surfaces 4j, 5j and 4k, 5k have an acute angle at the groove end angle φ with respect to the flanks 4a, 5a oriented outward in the radial direction of the tips 4, 5. In this configuration, the rigidity at the corners between the cutting edges 4d, 5d and the beveled surfaces 4j, 4k is increased so that chipping may be reduced. The grooves 24f, 25f may also achieve a similar effect as grooves 4f, 5f.

The tips includes tips 4 (first tips) with a groove located closer to one side with respect to the center position in the thickness direction of the cutting edges 4d and 5d, and tips 5 (second tips) with a groove located closer to the opposite side. The tips 4 and 5 may be alternately arranged in the circumferential direction. In this configuration, it is possible to prevent the load in the lateral direction from de-centering during cutting. Further, since the cutting chips are split, the cutting chips are properly discharged so that an influence of the cutting chips on the cut surfaces of the workpiece may be reduced.

The various examples described above in detail with reference to the attached drawings are intended to be representative of the invention and are thus non limiting embodiments. The detailed description is intended to teach a person of skill in the art to make, use, and/or practice various aspects of the present teachings and thus does not limit the scope of the invention in any manner. Furthermore, each of the additional features and teachings disclosed above may be applied and/or used separately or with other features and teachings in any combination thereof, to provide an improve tipped circular saw blade and/or methods of making and using the same.

The invention claimed is:

1. A tipped circular saw blade, comprising:
a disc-shaped metal base having a central axis of rotation and a direction of rotation about the central axis; and
a plurality of tips extending radially outward from an outer periphery of the metal base, wherein:
an outer diameter of the circular saw blade is 280 mm to 500 mm,
a blade thickness of each tip is 0.8 mm to 1.1 mm, and each of the tips includes:
a flank disposed along a radially outer end of the tip,
a side face positioned on a lateral side of the flank in a thickness direction, and
a chamfer extending between the flank and the side face, wherein the chamfer is oriented at a chamfered angle with respect to the flank,
a cutting edge positioned at a leading end of the flank relative to the direction of rotation, wherein the cutting edge is configured to cut a workpiece, and
a groove formed on the flank and extending from the cutting edge in the circumferential direction, wherein the groove has a width of 0.20 mm to 0.30 mm in the thickness direction.

2. The tipped circular saw blade of claim 1, wherein:
the groove includes a pair of groove ends at the cutting edge, a pair of straight beveled surfaces extending from each of the groove ends, and a curved groove bottom extending between the pair of beveled surfaces, and
an acute groove end angle is formed between each beveled surfaces and the flank in front view.

3. The tipped circular saw blade of claim 2, wherein each acute groove end angle are 40° to 60°.

4. The tipped circular saw blade of claim 2, wherein the cosine of the acute groove end angle is less than twice the cosine of a chamfered angle formed between the chamfer and flank.

5. The tipped circular saw blade of claim 1, wherein a width of the groove is greatest at the cutting edge.

6. The tipped circular saw blade of claim 1, wherein a radial depth of the groove decreases in the circumferential direction.

7. A tipped circular saw blade, comprising:
a disc-shaped metal base having a central axis of rotation and a direction of rotation about the central axis;
a plurality of circumferentially-spaced tips extending radially outward from an outer periphery of the metal base; and
a groove formed on a radially outer end of each tip, wherein each groove extends along the radially outer end of each tip in a circumferential direction;
wherein a ratio of a blade thickness of each tip to a width of the groove of each tip is 2.6 to 5.5.

8. The tipped circular saw blade of claim 7, wherein an inner surface of the groove forms an acute angle with the radially outer end of the tip.

9. The tipped circular saw blade of claim 7, wherein a distance measured between opposing sides of each groove narrows moving in the circumferential direction from a leading end of the tip relative to the direction of rotation.

10. The tipped circular saw blade of claim 7, wherein a width of each groove at the outer end of the corresponding tip is 0.20 mm to 0.30 mm.

11. The tipped circular saw blade of claim 7, wherein a leading end of each groove relative to the direction of rotation has a rake angle of 0° to 30°.

12. The tipped circular saw blade of claim 7, wherein a radial depth of each groove decreases moving in a circumferential direction from a leading end of the groove relative to the direction of rotation to a trailing end of the groove.

13. The tipped circular saw blade of claim 7, wherein the grooves on two circumferentially adjacent tips are misaligned with respect to a center line of the two adjacent tips.

14. The tipped circular saw blade of claim 7, wherein an inner surface of each groove is straight.

15. The tipped circular saw blade of claim 7, wherein an inner surface of each groove is curved.

16. The tipped circular saw blade of claim 7, wherein a radial depth of each groove is greater than 0.10 mm.

17. The tipped circular saw blade of claim 7, further comprising a chamfer extending between the radially outer end of each tip and a side surface of the corresponding tip.

18. The tipped circular saw blade of claim 17, further comprising a flank facing radially outward at the radially outer end of each tip, and a cutting edge positioned at a leading end of each flank relative to the direction of rotation, wherein each cutting edge is configured to cut a workpiece, wherein each groove includes a pair of groove ends at the cutting edge of the corresponding tip, a pair of straight beveled surfaces extending from each of the groove ends of the corresponding tip, and a curved groove bottom extending between the pair of beveled surfaces of the corresponding tip.

19. The tipped circular saw blade of claim 18, wherein an acute groove end angle is formed between the beveled surface and the corresponding flank.

20. The tipped circular saw blade of claim 17, wherein each groove has a depth less than a height of the chamfer of corresponding tip.

* * * * *